United States Patent
Ishikura

(10) Patent No.: US 10,333,414 B2
(45) Date of Patent: Jun. 25, 2019

(54) SWITCHING POWER SUPPLY DEVICE

(71) Applicant: Murata Manufacturing Co., Ltd., Nagaokakyo-shi, Kyoto-fu (JP)

(72) Inventor: Yuki Ishikura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/159,915

(22) Filed: Oct. 15, 2018

(65) Prior Publication Data

US 2019/0052178 A1    Feb. 14, 2019

Related U.S. Application Data

(63) Continuation of application No. PCT/JP2017/020538, filed on Jun. 2, 2017.

(30) Foreign Application Priority Data

Jun. 6, 2016   (JP) .................................. 2016-112341

(51) Int. Cl.
*H02M 3/335*    (2006.01)
*H02M 3/337*    (2006.01)
(Continued)

(52) U.S. Cl.
CPC ..... *H02M 3/33569* (2013.01); *H02M 3/3376* (2013.01); *H02M 3/33507* (2013.01);
(Continued)

(58) Field of Classification Search
CPC ......... H02M 3/33507; H02M 3/33523; H02M 3/33569; H02M 3/3376; H02M 2001/0058; H02M 2007/4818
See application file for complete search history.

(56) References Cited

U.S. PATENT DOCUMENTS

| 8,422,250 | B2 | 4/2013 | Halberstadt | |
| 8,988,901 | B2 * | 3/2015 | Hara | H02M 3/33592 363/21.02 |

(Continued)

FOREIGN PATENT DOCUMENTS

| CN | 102386773 A | 3/2012 |
| CN | 103378757 A | 10/2013 |

(Continued)

OTHER PUBLICATIONS

International Search Report issued for PCT/JP2017/020538, dated Jul. 4, 2017.

(Continued)

*Primary Examiner* — Matthew V Nguyen
(74) *Attorney, Agent, or Firm* — Arent Fox LLP

(57) ABSTRACT

The switching power supply device includes switching circuits, a transformer, an LLC resonance circuit, a microcomputer and a frequency regulator that sets switching frequencies of the switching circuits and a current detection circuit that detects the current Ir. The microcomputer and the frequency regulator sweep a switching frequency, and set a switching frequency on the basis of times to start the dead times of the switching elements, the current Ir detected by the current detection circuit, and the threshold current Imin.

20 Claims, 8 Drawing Sheets

(51) Int. Cl.
*H02M 7/48* (2007.01)
*H02M 1/00* (2006.01)

(52) U.S. Cl.
CPC ............... *H02M 2001/0058* (2013.01); *H02M 2007/4818* (2013.01)

(56) References Cited

U.S. PATENT DOCUMENTS

| | | |
|---|---|---|
| 9,071,156 B2 | 6/2015 | Fukutani |
| 9,318,946 B2* | 4/2016 | Feng ....................... H02M 1/36 |
| 2007/0041222 A1* | 2/2007 | Eguchi .................... H02M 1/10 |
| | | 363/17 |
| 2010/0033998 A1 | 2/2010 | Halberstadt |
| 2011/0211370 A1* | 9/2011 | Luo .................. H02M 3/33592 |
| | | 363/21.02 |
| 2012/0134705 A1 | 5/2012 | Fukutani |
| 2015/0229225 A1* | 8/2015 | Jang ...................... H02M 3/285 |
| | | 363/17 |
| 2017/0133943 A1* | 5/2017 | Garrity .................. H02J 3/383 |

FOREIGN PATENT DOCUMENTS

| | | | |
|---|---|---|---|
| JP | 2008535455 A | 8/2008 |
| JP | 2012120314 A | 6/2012 |
| JP | 2013027270 A | 2/2013 |
| JP | 2014217199 A | 11/2014 |

OTHER PUBLICATIONS

Written Opinion of the International Searching Authority issued for PCT/JP2017/020538, dated Jul. 4, 2017.

\* cited by examiner

SWITCHING POWER SUPPLY DEVICE

CROSS REFERENCE TO RELATED APPLICATIONS

The present application is a continuation of PCT/JP2017/020538 filed Jun. 2, 2017, which claims priority to Japanese Patent Application No. 2016-112341, filed Jun. 6, 2016, the entire contents of each of which are incorporated herein by reference.

TECHNICAL FIELD

The present disclosure relates to a switching power supply device including an LLC resonance circuit.

BACKGROUND

In a domestic photovoltaic power generating system where power generated by a generator such as a solar panel is used, power is controlled by a power conditioner. For example, Patent Document 1 (identified below) describes an example of power conversion equipment preferably used in such a power conditioner. The power conversion equipment described in Patent Document 1 includes a current resonant converter. A switching frequency is changed to obtain a switching frequency at which the highest power conversion efficiency is achieved. By so doing, a switching frequency corresponding to the resonant frequency of the current resonant converter is detected, and the detected frequency is set. This decreases switching loss and noise and improves efficiency.

Patent Document 1: Japanese Unexamined Patent Application Publication No. 2014-217199.

In the power conversion equipment described in Patent Document 1, even if the leakage inductance of a transformer and the capacitance of a resonant capacitor deviate from respective design values, which causes a resonant frequency to deviate from a design value, an optimal switching frequency can be set. However, according to the equipment described in Patent Document 1, a switching frequency is set so that the highest power conversion efficiency is achieved. Thus, unless predetermined conditions such as controlled input/output power are met, a switching frequency cannot be set.

SUMMARY OF THE INVENTION

In view of the above, an objective of the present disclosure is to provide a switching power supply device that searches for an optimal switching frequency.

Thus, a switching power supply device according to an exemplary embodiment of the present disclosure includes a first input/output port and a second input/output port; a first switching circuit connected to the first input/output port and having a high-side switch element and a low-side switch element; a second switching circuit connected to the second input/output port and having a high-side switch element and a low-side switch element; a transformer having a first coil and a second coil which are magnetically coupled to each other, the first coil being connected to the first switching circuit, the second coil being connected to the second switching circuit; and a resonance circuit including the first coil or the second coil. Moreover, a switching frequency setting unit that is configured to set switching frequencies of the first switching circuit and the second switching circuit is included, and a current detection unit is provided that is configured to detect currents input to and output from the first input/output port or the second input/output port, in which the switching frequency setting unit sweeps a switching frequency and sets a switching frequency in accordance with a time when a dead time starts, a result of detection by the current detection unit, and a threshold current value, the dead time being provided for switching between the high-side switch element and the low-side switch element of the first switching circuit or the second switching circuit.

With this configuration, switching loss can be advantageously decreased by modifying the switching frequency in accordance with the load current. Even after the manufacturing of the switching power supply device, an optimal switching frequency can be searched for, thereby decreasing the number of inspection processes carried out when the products are produced in large quantities. Even if the resonant frequency of a resonance circuit changes due to degradation over time, an optimal switching frequency can be searched for.

According to an exemplary aspect, when times at which the high-side switch elements and the low-side switch elements of the first switching circuit and the second switching circuit are turned off coincide with times at which a current value detected by the current detection unit falls below the threshold current value, the switching frequency setting unit may decrease a switching frequency. Moreover, when the times do not coincide, the switching frequency setting unit may increase the switching frequency.

With this configuration, as long as times to start the dead times of the switch elements and the result of the current detection can be obtained, the switching frequency can be appropriately swept. Thus, high-speed processing is not required.

In an exemplary aspect, the switching frequency setting unit may periodically set a switching frequency. With this configuration, high power conversion efficiency can be maintained.

In another exemplary aspect, the first switching circuit or the second switching circuit may be a half bridge circuit or a full bridge circuit.

According to an exemplary aspect of the present disclosure, switching loss can be decreased by modifying a switching frequency in accordance with the load current. Even after the manufacturing of a switching power supply device, an optimal switching frequency can be set, thereby decreasing the number of inspection processes carried out when the products are produced in large quantities. Even if the resonant frequency of a resonance circuit changes due to degradation over time, an optimal switching frequency can be set.

DETAILED DESCRIPTION OF EXEMPLARY EMBODIMENTS

Embodiment 1

Figure 1:
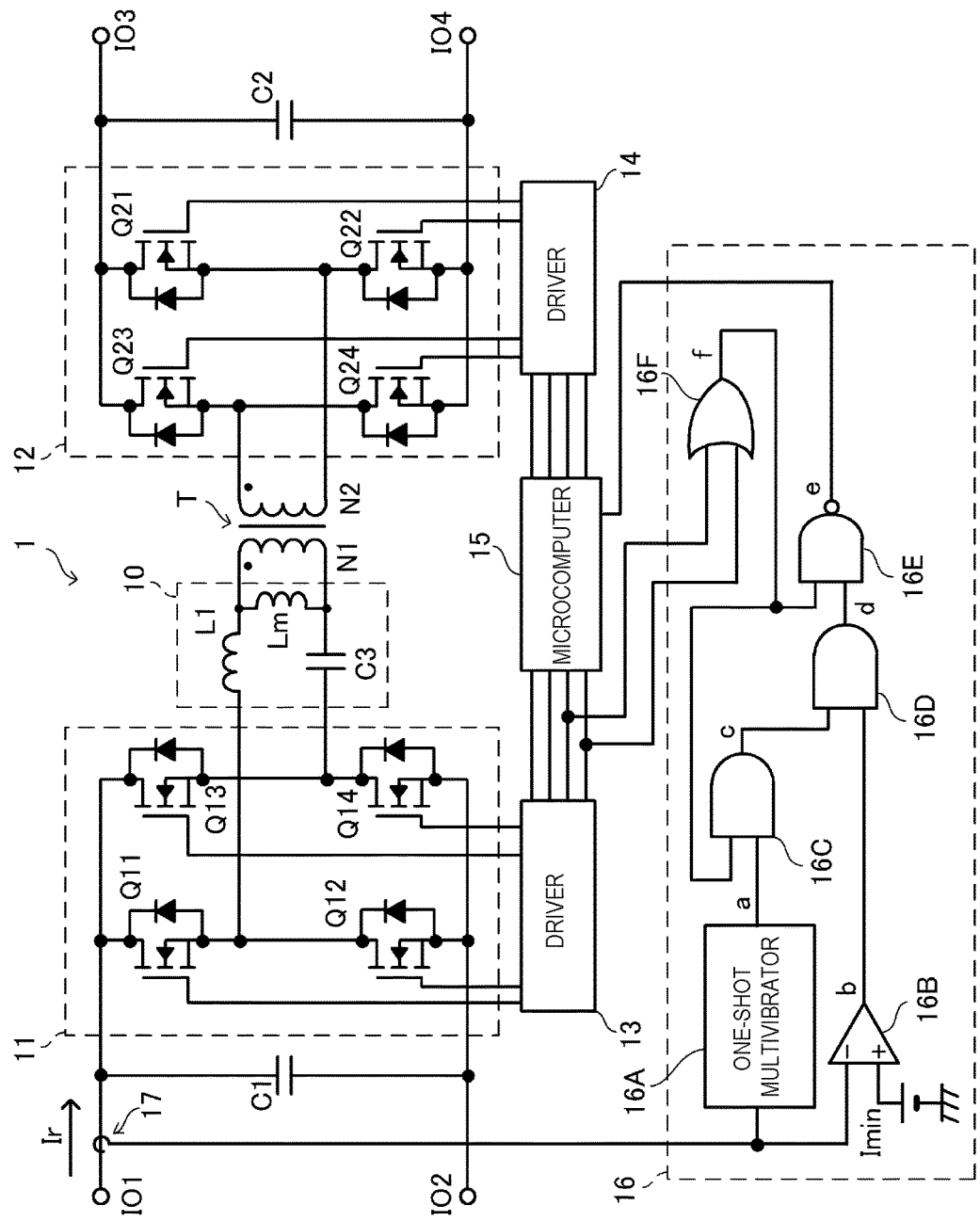
FIG. 1 is a circuit diagram of a switching power supply device according to an exemplary Embodiment 1.

FIG. 1 is a circuit diagram of a switching power supply device 1 according to an exemplary Embodiment 1.

According to an exemplary aspect, the switching power supply device 1 is a current resonant DC-DC converter and is used, for example, in a photovoltaic power generating system. Hereinafter, for purposes of this disclosure, it is assumed that the current resonant DC-DC converter is an insulation converter and has full bridge circuits, one on the primary side and one on the secondary side.

As shown, the switching power supply device 1 includes a pair of an input/output terminal IO1 and an input/output terminal IO2 and a pair of an input/output terminal IO3 and an input/output terminal IO4. The input/output terminal IO1 and the input/output terminal IO2 are connected to a battery that stores power generated by solar panels. The input/output terminal IO3 and the input/output terminal IO4 are connected to the solar panels and a power grid.

It is noted that the pair of the input/output terminal IO1 and the input/output terminal IO2 is an example of the "first input/output port" according to the present disclosure. Moreover, the pair of the input/output terminal IO3 and the input/output terminal IO4 is an example of the "second input/output port" according to the present disclosure.

According to the exemplary aspect, the switching power supply device 1 is a bidirectional DC-DC converter. The switching power supply device 1 is configured to transform a DC voltage input from the input/output terminal IO3 and the input/output terminal IO4 to a voltage of a predetermined value and then outputs the transformed voltage to the battery connected to the input/output terminal IO1 and the input/output terminal IO2 to charge the battery. When the charging voltage of the battery is input from the input/output terminal IO1 and the input/output terminal IO2, the switching power supply device 1 transforms the charging voltage to a voltage of a predetermined value and supplies the voltage to the power grid connected to the input/output terminal IO3 and the input/output terminal IO4.

A capacitor C1 and a switching circuit 11 are connected to the input/output terminal IO1 and the input/output terminal IO2. The switching circuit 11 is a full bridge circuit in which a series circuit of a switching element Q11 and a switching element Q12 and a series circuit of a switching element Q13 and a switching element Q14 are connected in parallel. The switching elements Q11 to Q14 are, for example, MOS-FETs, and gates thereof are connected to a driver 13.

It is noted that the switching circuit 11 is an example of the "first switching circuit" according to the present disclosure. Moreover, the switching element Q11 and the switching element Q13 are examples of the "high-side switch elements" according to the present disclosure and the switching element Q12 and the switching element Q14 are examples of the "low-side switch elements" according to the present disclosure.

A node between the switching element Q11 and the switching element Q12 is connected to a primary winding N1 of a transformer T via an inductor L1. The primary winding N1 is an example of the "first coil" according to the present disclosure. As shown, the node between the switching element Q13 and the switching element Q14 is connected to the primary winding N1 of the transformer T via a capacitor C3. An inductor Lm, illustrated in FIG. 1, is the magnetizing inductance of the transformer T. It should be noted that the inductor Lm may be an external actual component. The inductor L1, the capacitor C3, and the inductor Lm constitute an LLC resonance circuit 10.

It is noted that the inductor L1 is not necessarily an external actual component, but may be leakage inductance of the transformer T. In this case, the number of components can be decreased, thereby enabling cost reduction and miniaturization.

A capacitor C2 and a switching circuit 12 are connected to the input/output terminal IO3 and the input/output terminal IO4. The switching circuit 12 is a full bridge circuit in which a series circuit of a switching element Q21 and a switching element Q22 and a series circuit of a switching element Q23 and a switching element Q24 are connected in parallel. The switching elements Q21 to Q24 are, for example, MOS-FETs, and gates thereof are connected to a driver 14.

It is noted that the switching circuit 12 is an example of the "second switching circuit" according to the present disclosure. The switching element Q21 and the switching element Q23 are examples of the "high-side switch elements" according to the present disclosure. The switching element Q22 and the switching element Q24 are examples of the "low-side switch elements" according to the present disclosure.

A node between the switching element Q21 and the switching element Q22 is connected to a secondary winding N2 of the transformer T. A node between the switching element Q23 and the switching element Q24 is connected to the secondary winding N2 of the transformer T. The secondary winding N2 is an example of the "second coil" according to the present disclosure.

In the exemplary aspect, the driver 13 outputs control signals to the gates of the switching elements Q11 to Q14 and performs switching control of the switching elements Q11 to Q14 at a switching frequency set by a microcomputer 15. Specifically, the driver 13 alternately turns on and off the switching element Q11 and the switching element Q14, and the switching element Q12 and the switching element Q13 with dead times being provided for switching between the elements.

The driver 14 outputs control signals to the gates of the switching elements Q21 to Q24 and performs switching control of the switching elements Q21 to Q24 at a switching frequency set by the microcomputer 15. Specifically, the driver 14 alternately turns on and off the switching element Q21 and the switching element Q24, and the switching element Q22 and the switching element Q23 with dead times being provided for switching between the elements.

The microcomputer 15 outputs a control signal so as to switch between the switching circuit 11 and the switching circuit 12 at a predetermined switching frequency. The driver 13 and the driver 14 drive the switching elements on the basis of the control signal. The microcomputer 15 sweeps a switching frequency to search for a switching frequency corresponding to the resonant frequency of the LLC resonance circuit 10. In this aspect, the power conversion efficiency of the switching power supply device 1 is improved by performing switching control of the switching circuit 11 and the switching circuit 12 at a switching frequency corresponding to the resonant frequency of the LLC resonance circuit 10. The microcomputer 15 is an example of the "switching frequency setting unit" according to the present disclosure. In an exemplary aspect, the microcomputer 15 includes the appropriate hardware and software needed to perform the frequency sweeping algorithms described herein.

In the sweeping of the switching frequency, when a H-level signal is received from a frequency regulator 16, the microcomputer 15 decreases the switching frequency to search for an optimal switching frequency, meanwhile, when a L-level signal is received, the microcomputer 15 increases the switching frequency to search for an optimal switching frequency. The frequency regulator 16 is an example of the "switching frequency setting unit" according to the present disclosure.

As shown, the frequency regulator 16 includes a one-shot multivibrator 16A, a comparator 16B, an AND gate 16C, an AND gate 16D, an NAND gate 16E, and an OR gate 16F.

The one-shot multivibrator 16A outputs, with the falling of a current Ir as a trigger, a H-level signal for a certain duration. The current Ir is a resonant current input to and output from the input/output terminal IO1. When the current Ir is falling, an output signal (a) of the one-shot multivibrator 16A indicates the H level. The current Ir is detected by a current detection circuit 17 connected to the input/output terminal IO1. The current detection circuit 17 includes a component such as a current transformer or a resistor. The current detection circuit 17 is an example of the "current detection unit" according to the present disclosure.

It should be noted that the one-shot multivibrator 16A can be replaced with, for example, a differentiating circuit, where appropriate, as long as it can detect the falling of a current.

The comparator 16B compares the current Ir detected by the current detection circuit 17 and a threshold current Imin. When the current Ir falls below the threshold current Imin, an output signal (b) of the comparator 16B indicates the H level. When the current Ir exceeds the threshold current Imin, the output signal (b) of the comparator 16B indicates the L level. The threshold current Imin is, for example, the maximum value of the magnetizing current of the transformer T and is appropriately set in accordance with the design of the transformer.

The OR gate 16F outputs the logical sum of a gate signal input to the switching element Q11 and a gate signal input to the switching element Q12. As described above, the switching element Q11 and the switching element Q14, and the switching element Q12 and the switching element Q13 are alternately turned on and off with dead times being provided for switching between the elements. That is, an output signal (f) of the OR gate 16F indicates the L level during the dead times and indicates the H level at times other than the dead times.

It should be noted that the OR gate 16F may output the logical sum of a gate signal input to the switching element Q13 and a gate signal input to the switching element Q14.

The AND gate 16C outputs the AND of the output of the one-shot multivibrator 16A and the output of the OR gate 16F. When the current Ir is falling and when the switching element Q11 or the switching element Q12 is on, an output signal (c) of the AND gate 16C indicates the H level.

The AND gate 16D outputs the AND of the output signal (b) of the comparator 16B and the output signal (c) of the AND gate 16C. When the switching element Q11 or the switching element Q12 is on, the current Ir is falling, and when the current Ir falls below the threshold current Imin, an output signal (d) of the AND gate 16D indicates the H level.

The NAND gate 16E outputs the NAND of the output signal (d) of the AND gate 16D and the output signal (f) of the OR gate 16F. When the switching element Q11 or the switching element Q12 is on, the current Ir is falling, and when the current Ir falls below the threshold current Imin, an output signal (e) of the NAND gate 16E indicates the L level.

Hereinafter, a case will be described in which switching control of the switching circuit 11 and the switching circuit 12 is performed at an optimal switching frequency corresponding to the resonant frequency of the LLC resonance circuit 10. The switching circuit 11 and the switching circuit 12 are preferably controlled by a ZVS ("zero voltage switching") method with less switching loss.

For instance, when the switching element Q11 and the switching element Q14 are on, a resonant current flows from the input/output terminal IO1 toward the switching circuit 11. This direction in which the current flows is considered a normal direction. In this state, after the resonant current falls below the threshold current Imin, the switching element Q11 and the switching element Q14 are turned off. During a dead time immediately after the turning-off, the current flows in reverse through the body diodes of the switching element Q12 and the switching element Q13. When the switching element Q12 and the switching element Q13 are turned on in the reverse-flow period, ZVS is performed. The resonant current then starts flowing through the switching element Q12 and the switching element Q13.

Thus, if the switching control is performed on the switching circuit 11 and the switching circuit 12 at the optimal switching frequency while reducing switching loss, the switching elements should preferably not be turned off in the resonance periods.

Figure 2:
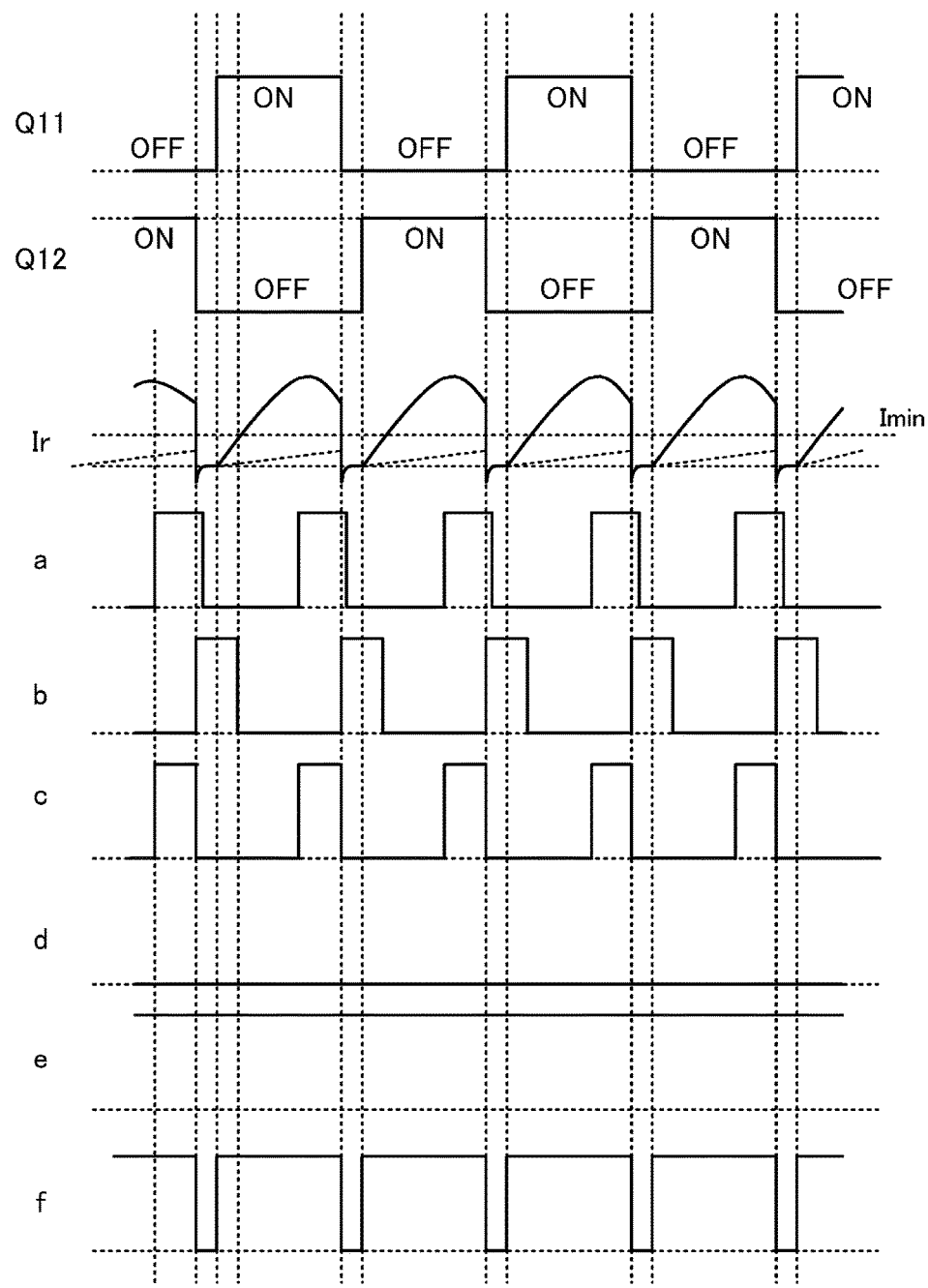
FIG. 2 illustrates operation waveforms of elements of a frequency regulator when switching frequencies exceed a resonant frequency.

FIG. 2 illustrates operation waveforms of the elements of the frequency regulator 16 when switching frequencies exceed the resonant frequency.

In this example, the switching element Q11 and the switching element Q12 are not turned off in the periods in which the current Ir falls below the threshold current Imin. That is, the switching element Q11 and the switching element Q12 are turned off in the resonance periods. Accordingly, the switching frequencies of the switching element Q11 and the switching element Q12 exceed the optimal switching frequency.

Here, the output signal (output signal (e) of the NAND gate 16E) of the frequency regulator 16 always indicates the H level. When a H-level output signal is received from the frequency regulator 16, the microcomputer 15 decreases the switching frequencies to be swept.

Figure 3:
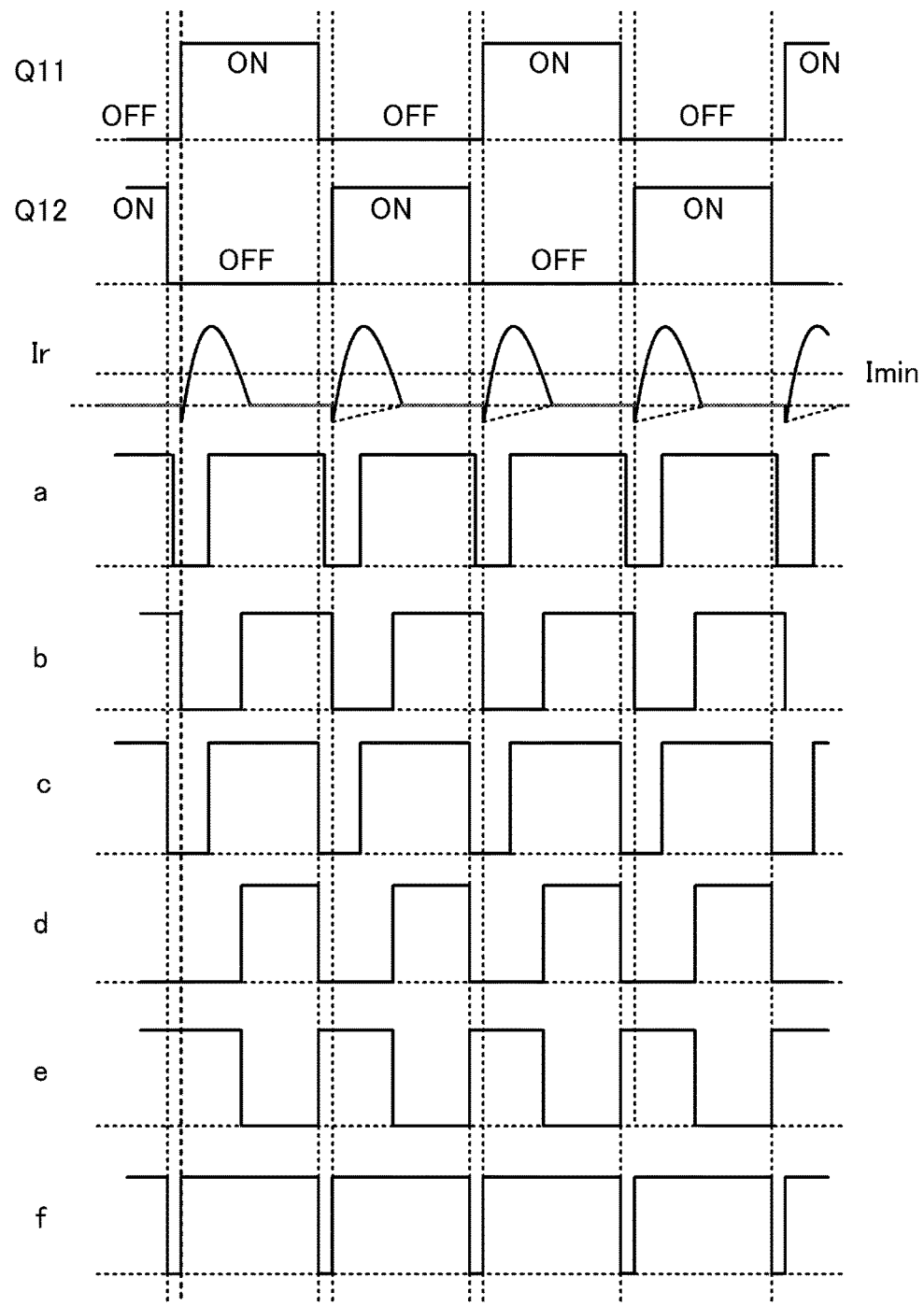
FIG. 3 illustrates operation waveforms of the elements of the frequency regulator when switching frequencies fall below the resonant frequency.

FIG. 3 illustrates operation waveforms of the elements of the frequency regulator 16 when the switching frequencies fall below the resonant frequency.

In this example, the switching element Q11 and the switching element Q12 are turned off in the periods in which the current Ir falls below the threshold current Imin. The periods in which a reverse-flow current flows (the periods in which the current Ir has an almost flat value), however, are long, and the switching frequencies of the switching element Q11 and the switching element Q12 fall below the optimal switching frequency.

In this state, the periods in which the output signal (e) of the frequency regulator 16 indicates the L level are long. When the periods in which the microcomputer 15 receives the L-level signal are long (or every time the L level is reached), the microcomputer 15 increases the switching frequencies to be swept.

Thus, the microcomputer 15 increases or decreases the switching frequencies in accordance with the output signal (f) of the OR gate 16F to cause the switching frequencies to be swept to approach the optimal switching frequency.

Figure 4:
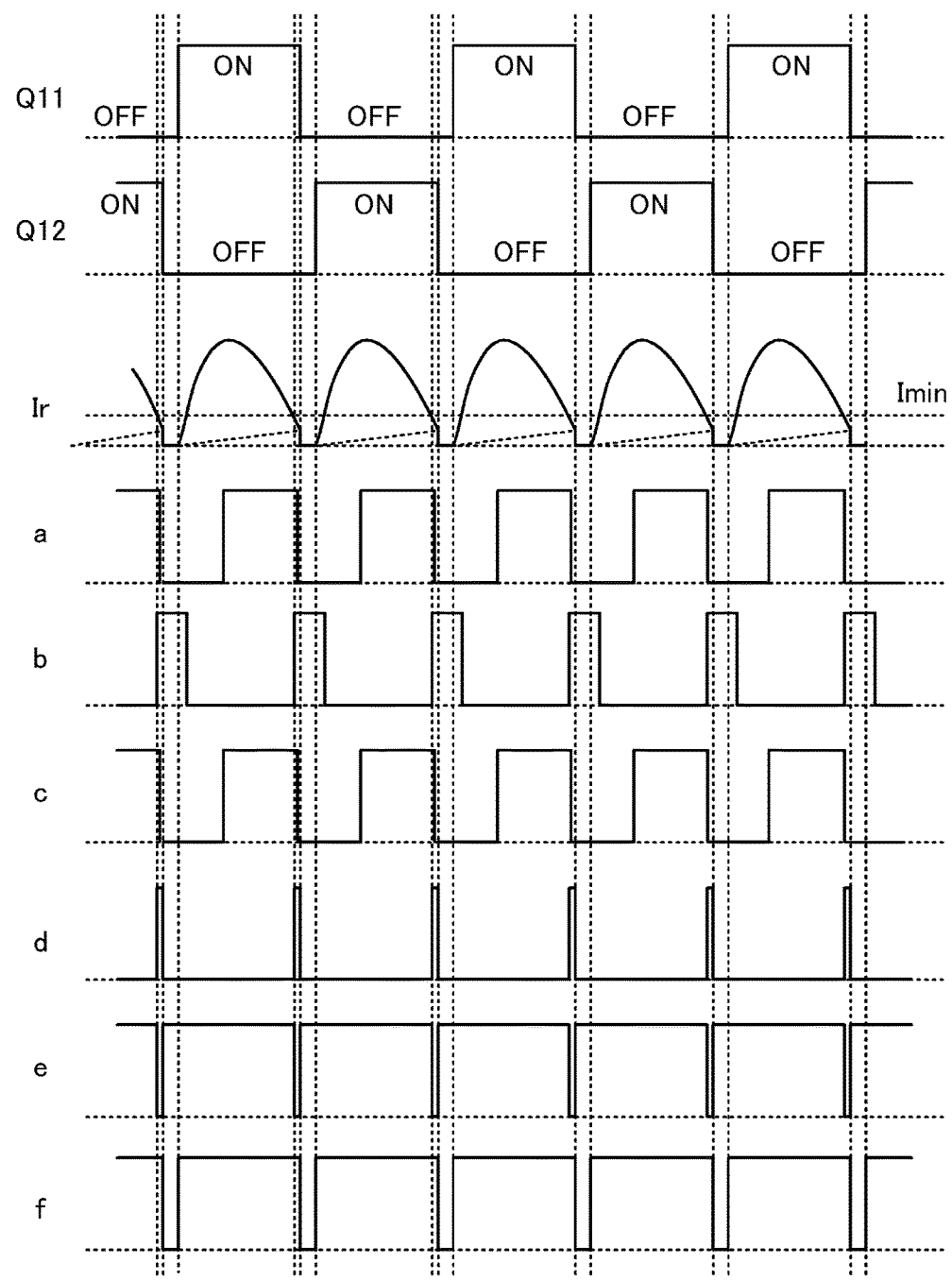
FIG. 4 illustrates operation waveforms of the elements of the frequency regulator when a switching frequency is an optimal switching frequency.

FIG. 4 illustrates operation waveforms of the elements of the frequency regulator 16 for the optimal switching frequency.

In this example, the switching element Q11 and the switching element Q12 are turned off in the periods in which the current Ir falls below the threshold current Imin. The switching element Q11 and the switching element Q12 are not turned off during the resonance periods. Accordingly, the switching frequencies of the switching element Q11 and the switching element Q12 are optimal switching frequencies. That is, the optimal switching frequencies can be searched for by sweeping the frequencies so that periods in which the output signal (e) of the frequency regulator 16 indicates the L level are optimized.

As described above, in the switching power supply device 1, switching loss can be reduced by modifying a switching frequency in accordance with the current Ir. As this search can be performed using a logic circuit, equipment such as a microcomputer which performs high-speed processing is not required. Thus, cost reduction can be achieved. Even after the manufacturing of the switching power supply device 1, an optimal switching frequency can be searched for, thereby decreasing the number of inspection processes carried out when the products are produced in large quantities. Even if the resonant frequency of the LLC resonance circuit 10 changes due to degradation over time, the optimal switching frequency can be searched for.

Preferably, the optimal switching frequency should be searched for periodically. By so doing, the switching power supply device 1 can maintain high power conversion efficiency.

It should be noted that in the present embodiment, the LLC resonance circuit 10 is provided on the primary side of the transformer T. However, the LLC resonance circuit 10 may be provided on the secondary side of the transformer T. Also, in the latter case, switching control of the switching elements is performed in the same manner as the former case.

In the present embodiment, the switching circuit 11 and the switching circuit 12 are described as full bridge circuits. However, the switching circuit 11 and the switching circuit 12 are not necessarily the full bridge circuits.

Figure 5:
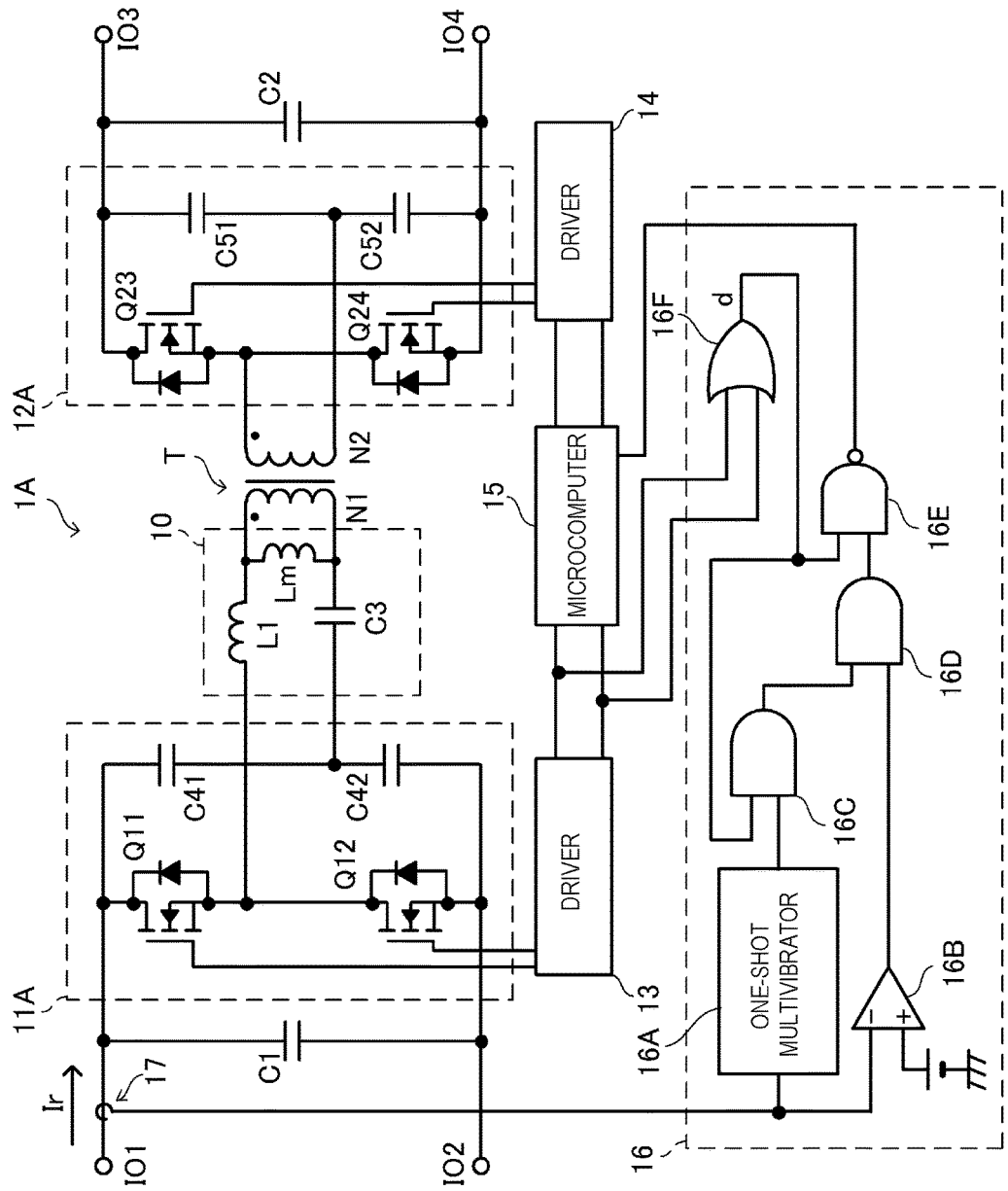
FIG. 5 is a circuit diagram of a switching power supply device in another exemplary aspect.

FIG. 5 is a circuit diagram of a switching power supply device 1A in another example. In this example, a switching circuit 11A connected to the input/output terminal IO1 and the input/output terminal IO2 is a half bridge circuit. A switching circuit 12A connected to the input/output terminal IO3 and the input/output terminal IO4 is a half bridge circuit.

As shown, the switching circuit 11A is a half bridge circuit in which a series circuit of the switching element Q11 and the switching element Q12 and a series circuit of a capacitor C41 and a capacitor C42 are connected in parallel.

The switching circuit 12A is a half bridge circuit in which a series circuit of the switching element Q23 and the switching element Q24 and a series circuit of a capacitor C51 and a capacitor C52 are connected in parallel.

Figure 6:
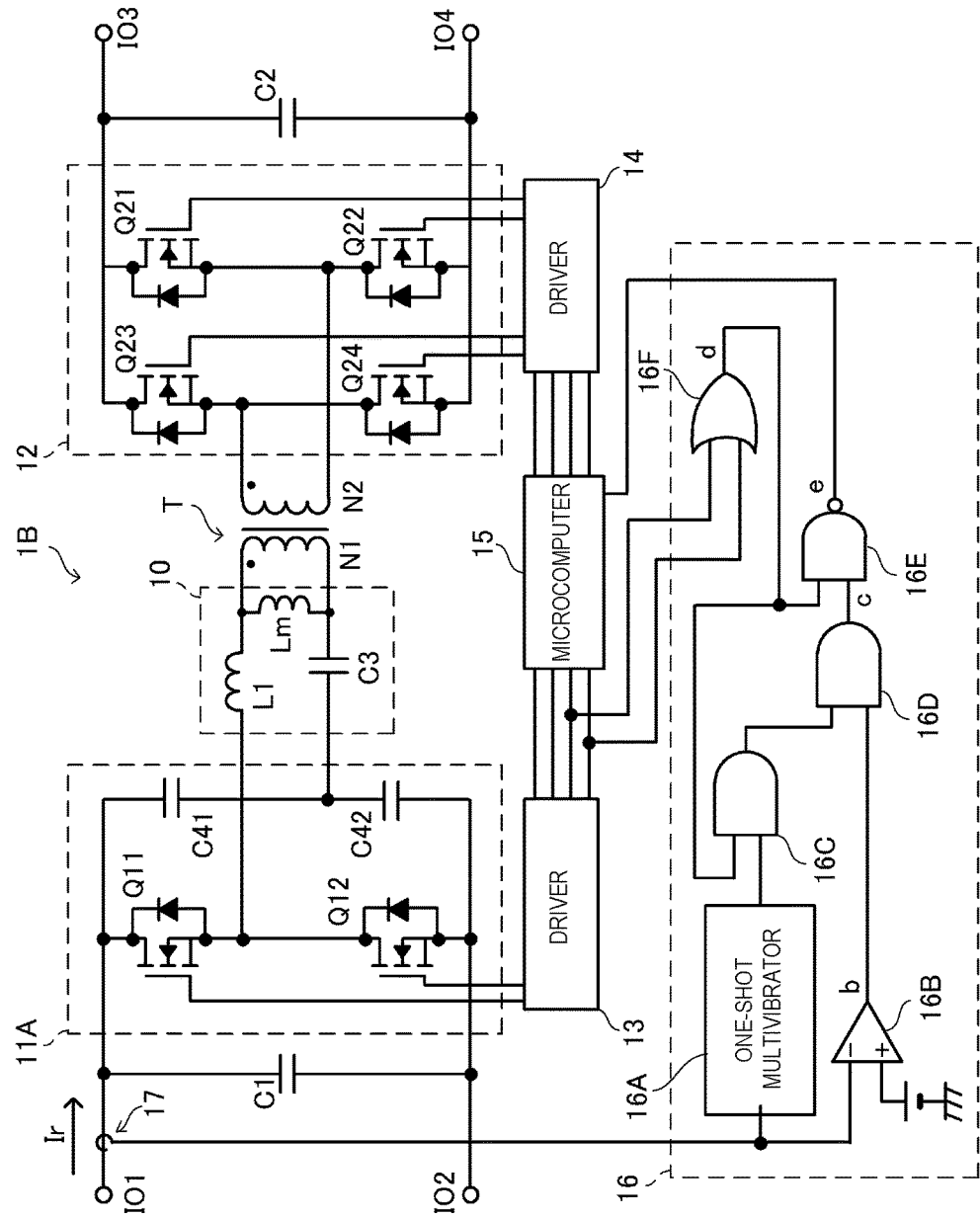
FIG. 6 is a circuit diagram of a switching power supply device in yet another exemplary aspect.

FIG. 6 is a circuit diagram of a switching power supply device 1B in another example. In this example, the switching circuit 11A, which is a half bridge circuit, is connected to the input/output terminal IO1 and the input/output terminal IO2. The switching circuit 12, which is a full bridge circuit, is connected to the input/output terminal IO3 and the input/output terminal IO4.

Even for the circuit configurations of the switching power supply device 1A and the switching power supply device 1B, an optimal switching frequency can be searched for.

It is noted that the current detection circuit 17 may be provided on the side where the input/output terminal IO3 is provided. In this case, the OR gate 16F of the frequency regulator 16 outputs the logical sum of a gate signal input to the switching element Q21 (or the switching element Q23) and a gate signal input to the switching element Q22 (or the switching element Q24). Furthermore, the current detection circuit 17 may be provided on the side where the input/output terminal IO2 is provided, or on the side where the input/output terminal IO4 is provided.

Embodiment 2

The switching power supply device according to exemplary Embodiment 1 is a bidirectional current resonant DC-DC converter, whereas a switching power supply device according to exemplary Embodiment 2 is a unidirectional current resonant DC-DC converter. Embodiment 2 differs from Embodiment 1 in this respect. Hereinafter, only differences from Embodiment 1 will be described.

Figure 7:
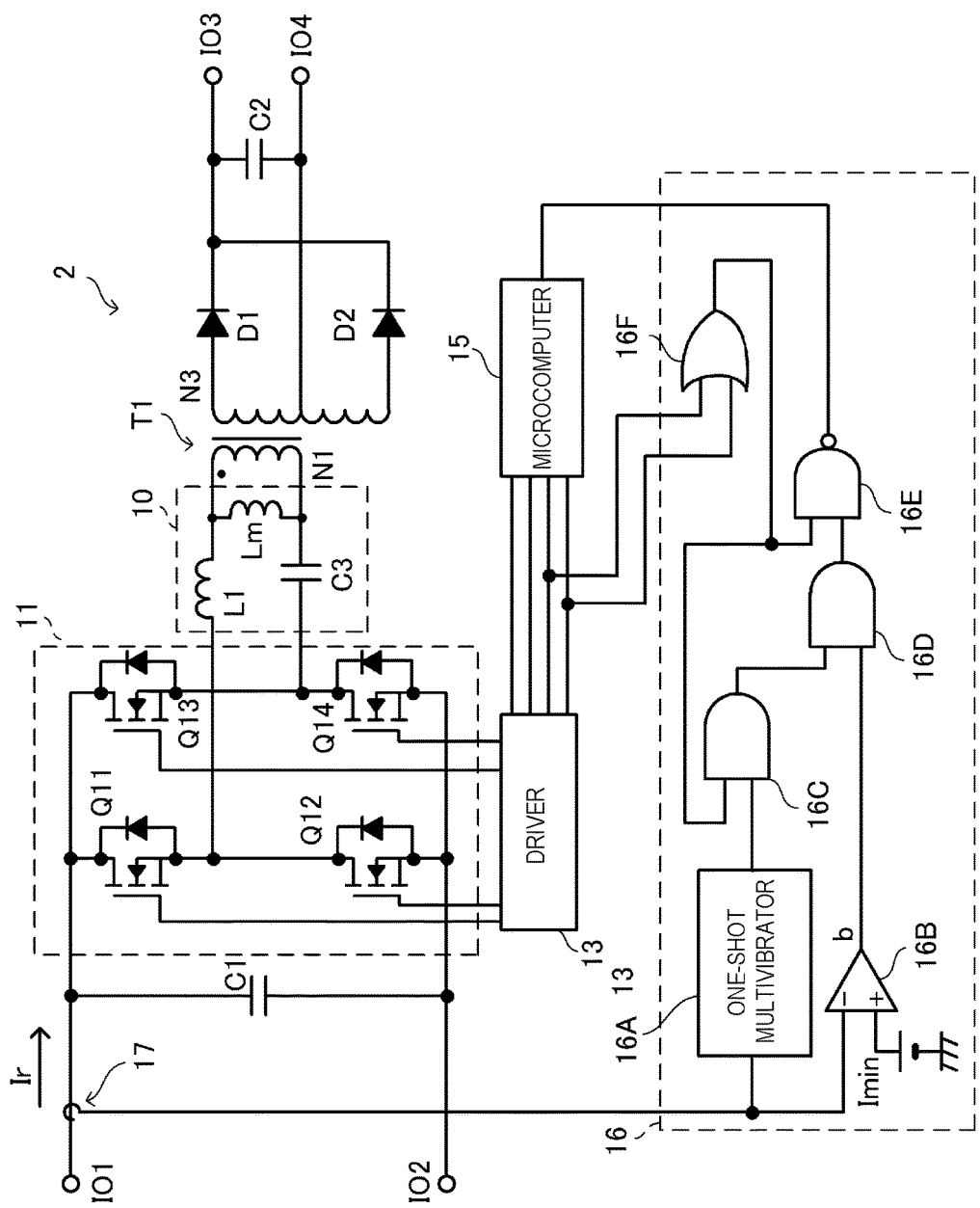
FIG. 7 is a circuit diagram of a switching power supply device according to an exemplary Embodiment 2.

FIG. 7 is a circuit diagram of a switching power supply device 2 according to exemplary Embodiment 2.

As shown, the switching power supply device 2 includes a transformer T1 including a primary winding N1 and a secondary winding N3. The primary winding N1 is connected to a switching circuit 11. The first end of the secondary winding N3 is connected to an input/output terminal IO3 via a diode D1. The second end of the secondary winding N3 is connected to the input/output terminal IO3 via a diode D2. The secondary winding N3 has a center tap, and the center tap is connected to an input/output terminal IO4.

A frequency regulator 16 of the switching power supply device 2 has the same configuration and operations as those described in Embodiment 1.

Figure 8:
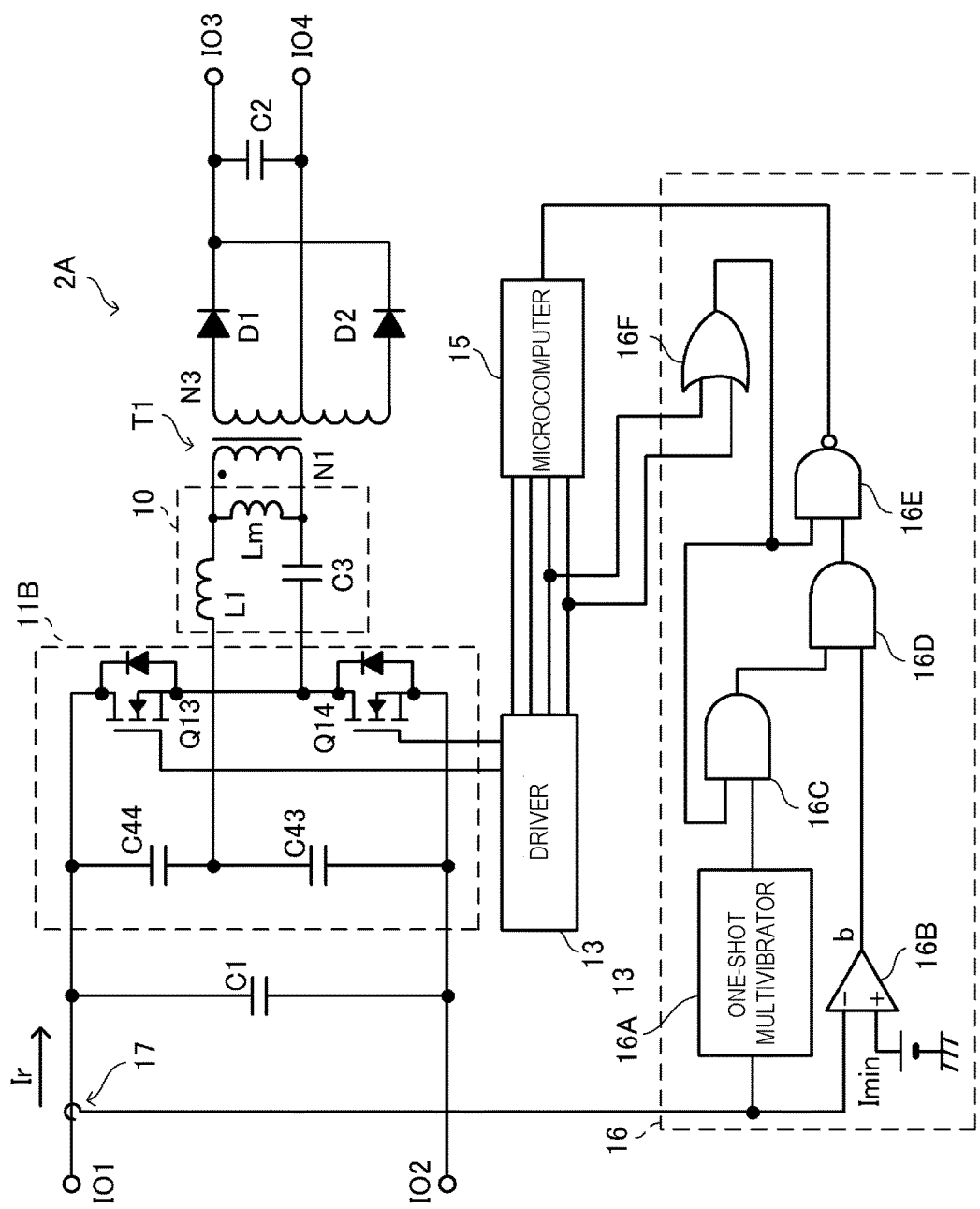
FIG. 8 is a circuit diagram of a switching power supply device in another exemplary aspect.

FIG. 8 is a circuit diagram of a switching power supply device 2A in another example. In this example, a switching circuit 11B, connected to an input/output terminal IO1 and an input/output terminal IO2, is a half bridge circuit.

The switching circuit 11B is a half bridge circuit in which a series circuit of a capacitor C43 and a capacitor C44 and a series circuit of a switching element Q13 and a switching element Q14 are connected in parallel.

Even for the configurations of the switching power supply device 2 and the switching power supply device 2A, switching loss can be reduced by modifying a switching frequency in accordance with a current Ir. As this search can be performed using a logic circuit, equipment such as a microcomputer which performs high-speed processing is not required. Accordingly, the cost reduction can be achieved. Even after the manufacturing of the switching power supply device 2 and the switching power supply device 2A, an optimal switching frequency can be searched for, thereby decreasing the number of inspection processes carried out when the products are produced in large quantities. Furthermore, even if the resonant frequency of the LLC resonance circuit 10 changes due to degradation over time, an optimal switching frequency can be searched for.

REFERENCE SIGNS LIST

C1, C2, C3 capacitor
C41, C42, C43, C44 capacitor

C51, C52 capacitor
D1, D2 diode
IO1, IO2 input/output terminal (first input/output port)
IO3, IO4 input/output terminal (second input/output port)
L1, Lm inductor
N1 primary winding (first coil)
N2, N3 secondary winding (second coil)
Q11, Q14 switching element (high-side switch element)
Q12, Q13 switching element (low-side switch element)
Q21, Q23 switching element (high-side switch element)
Q22, Q24 switching element (low-side switch element)
T, T1 transformer
1, 1A, 1B, 2, 2A switching power supply device
10 LLC resonance circuit
11, 11A, 11B switching circuit (first switching circuit)
12, 12A switching circuit (second switching circuit)
13, 14 driver
15 microcomputer (switching frequency setting unit)
16 frequency regulator (switching frequency setting unit)
16A one-shot multivibrator
16B comparator
16C AND gate
16D AND gate
16E NAND gate
16F OR gate
17 current detection circuit (current detection unit)

The invention claimed is:

1. A switching power supply device, comprising:
a first input/output port and a second input/output port;
a first switching circuit coupled to the first input/output port and including a high-side switch element and a low-side switch element;
a second switching circuit coupled to the second input/output port and including a high-side switch element and a low-side switch element;
a transformer having first and second coils magnetically coupled to each other, with the first coil coupled to the first switching circuit and the second coil coupled to the second switching circuit;
a resonance circuit including one of the first and second coils;
a switching frequency setting unit configured to set switching frequencies of the first switching circuit and the second switching circuit; and
a current detection circuit configured to detect at least one current input to and output from at least one of the first input/output port and the second input/output port,
wherein the switching frequency setting unit is configured to sweep a switching frequency and set a switching frequency based on a time when a dead time starts, the detected at least one current detected by the current detection circuit, and a threshold current value, and
wherein the dead time is set for switching between the high-side switch element and the low-side switch element of one of the first switching circuit and the second switching circuit.

2. The switching power supply device according to claim 1, wherein the switching frequency setting unit is configured to decrease the switching frequencies when times when the high-side switch elements and the low-side switch elements of the first switching circuit and the second switching circuit are turned off coincide with times when a current value of the at least one current detected by the current detection circuit falls below the threshold current value.

3. The switching power supply device according to claim 2, wherein the switching frequency setting unit is configured to increase the switching frequency when the respective times do not coincide.

4. The switching power supply device according to claim 1, wherein the switching frequency setting unit is configured to periodically set the switching frequencies.

5. The switching power supply device according to claim 1, wherein each of the first and second switching circuits comprises a full bridge circuit each having a pair of high-side switch elements and a pair of low-side switch elements.

6. The switching power supply device according to claim 1, wherein each of the first and second switching circuits comprises a half bridge circuit.

7. The switching power supply device according to claim 1, wherein the first switching circuit comprises a half bridge circuit and the second switching circuit comprises a full bridge circuit having a pair of high-side switch elements and a pair of low-side switch elements.

8. The switching power supply device according to claim 1, wherein the switching frequency setting unit comprises:
a one-shot multivibrator coupled to the current detection circuit to receive the at least one detected current;
a comparator configured to compare the at least one detected current with the threshold current value; and
a plurality of logic gates coupled to respective outputs of the one-shot multivibrator and the comparator,
wherein the switching frequency setting unit sweeps and sets the switching frequency based on an output signal of the plurality of logic gates.

9. The switching power supply device according to claim 8, wherein the comparator outputs a high level signal when the at least one detected current falls below the threshold current value and outputs a low level signal when the at least one detected current exceed the threshold current value.

10. The switching power supply device according to claim 9, wherein the threshold current value is a maximum value of a magnetizing current of the transformer.

11. The switching power supply device according to claim 9, wherein the plurality of logic gates include an OR gate configured to output a logical sum of a gate signal input to the high-side switch element and a gate signal input to the low-side switch element of the first switching circuit, such that the OR gate outputs a low level during the dead time and a high level at all times other than the dead time.

12. The switching power supply device according to claim 11, wherein the plurality of logic gates include a first AND gate configured to output an AND signal of the respective outputs of the one-shot multivibrator and the OR gate, such that the first AND gate outputs a high level when the at least one detected current is falling and at least one of the high-side switch element and the low-side switch element of the first switching circuit is on.

13. The switching power supply device according to claim 12, wherein the plurality of logic gates include a second AND gate configured to output an AND signal of the output of the first AND gate and the comparator, such that the second AND gate outputs a high signal when at least one of the high-side switch element and the low-side switch element of the first switching circuit is on, and the detected current falls below the threshold current value.

14. The switching power supply device according to claim 13, wherein the plurality of logic gates include a NAND gate configured to output, as the output signal of the switching frequency setting unit, a NAND of the output of the second AND gate and the output signal of the OR gate, such that the NAND gate outputs a low level when at least one of the high-side switch element and the low-side switch element of the first switching circuit is on, and the detected current falls below the threshold current value.

15. The switching power supply device according to claim 1, wherein the resonance circuit comprises a first inductor and a capacitor each coupling the first coil to the first switching circuit and a second inductor coupled in parallel to the first coil.

16. The switching power supply device according to claim 15, wherein the second inductor is either an external inductor component or a magnetizing inductance of the transformer.

17. The switching power supply device according to claim 1, wherein the resonance circuit comprises a first inductor and a capacitor each coupling the second coil to the second switching circuit and a second inductor coupled in parallel to the first coil.

18. The switching power supply device according to claim 17, wherein the second inductor is either an external inductor component or a magnetizing inductance of the transformer.

19. The switching power supply device according to claim 1, wherein the current detection circuit is configured to detect the current input to the first input/output port.

20. The switching power supply device according to claim 19, wherein the switching frequency setting unit is configured to decrease switching loss of the switching power supply device by adjusting the switching frequency based on the detected current input to the first input/output port.

* * * * *